United States Patent [19]

Silberschlag

[11] 4,083,440
[45] Apr. 11, 1978

[54] ENGAGING MECHANISM

[75] Inventor: Russell Earl Silberschlag, Glen Ellyn, Ill.

[73] Assignee: Borg-Warner Corporation, Chicago, Ill.

[21] Appl. No.: 732,265

[22] Filed: Oct. 14, 1976

[51] Int. Cl.² .................. F16D 33/00; F16D 3/34
[52] U.S. Cl. ................................. 192/3.31; 192/44
[58] Field of Search ................ 192/3.31, 93 R, 44

[56] References Cited

U.S. PATENT DOCUMENTS

| | | | |
|---|---|---|---|
| 3,054,488 | 9/1962 | General et al. | 192/44 |
| 3,240,308 | 3/1966 | Frost | 192/3.31 X |
| 3,476,226 | 11/1969 | Massey | 192/44 X |

Primary Examiner—Leonard H. Gerin

Attorney, Agent, or Firm—Robert L. Zieg

[57] ABSTRACT

A speed-responsive engaging mechanism adapted for use in a hydrodynamic device to couple turbine and impeller members including a disc secured to the turbine member having a series of cam surfaces thereon formed in apertures in the discs with a series of friction shoe assemblies mounted in the apertures in engagement with the cam surfaces. The friction shoe assemblies engage with the impeller at a predetermined speed of rotation of the turbine member, and the cam means induces a wedging engagement of the shoes with the impeller member. Spring means are provided to retain the shoe assemblies in the apertures, and a roller mechanism is provided in each shoe assembly to provide relatively frictionless relative movement between the cam surfaces and the shoe assemblies.

15 Claims, 4 Drawing Figures

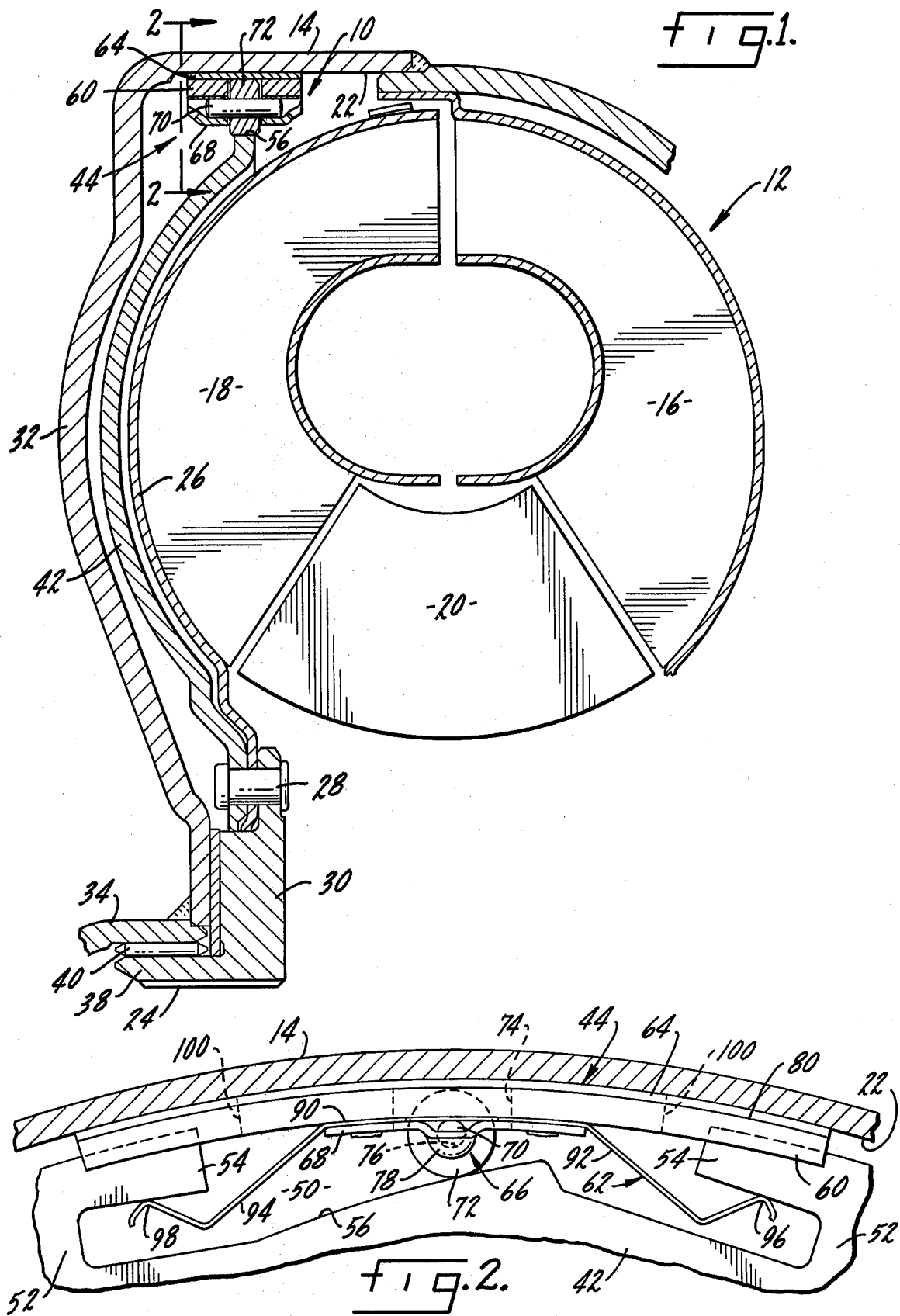

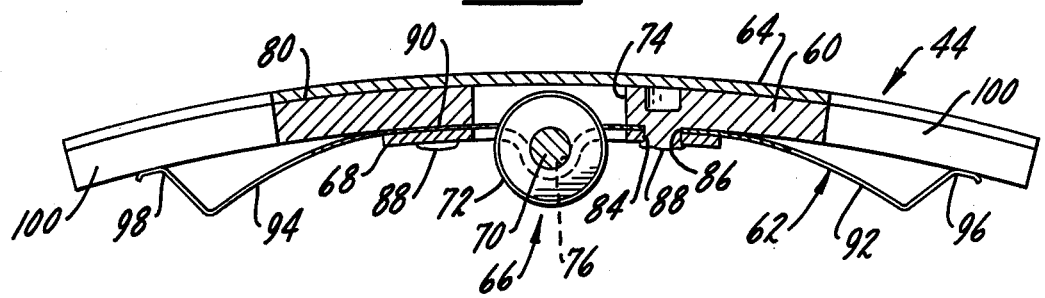
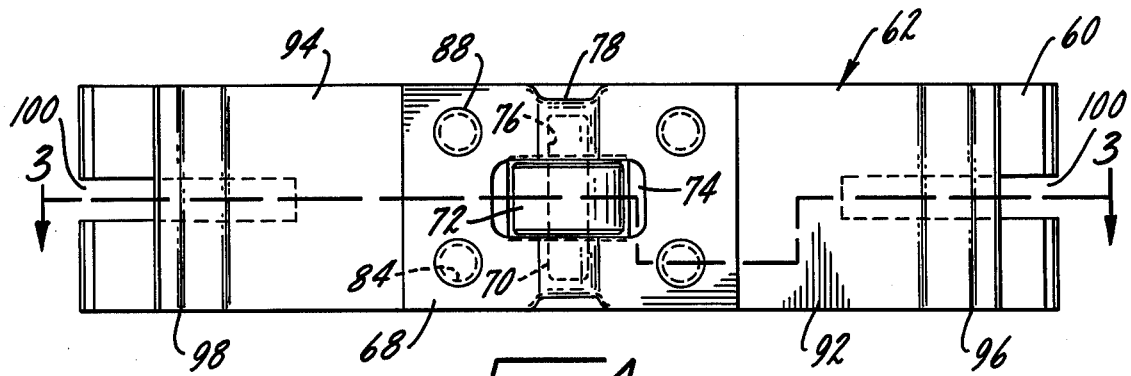

ENGAGING MECHANISM

BACKGROUND OF THE INVENTION

1. Field of the Invention

This application relates to the field of speed-responsive engaging devices for hydrodynamic devices.

2. Prior Art

It is known in the prior art to provide lock-up clutches for hydrodynamic devices. More particularly, copending applications, Ser. No. 620,461 filed Oct. 7, 1975 and Ser. No. 700,998 filed June 29, 1976 of common assignee provide clutch mechanisms for hydrodynamic devices having a shoe assembly engaged by centrifugal force and, in addition, engaged by a wedging effect of cam surfaces, and such clutch devices lock together the impeller and turbine elements to improve efficiency by eliminating slippage. It has been recognized that the structures of the aforementioned applications as well as the device to be described herein provide a solution to the problem of lock-up clutches to provide a lock-up clutch which disengages during torque impulses or torque reversals to provide smooth, shockless operation and eliminate torsional vibrations.

These previous solutions to the torque converter clutch problem, although workable and dramatic improvements over those known prior, have a somewhat sensitive characteristic which can be vastly improved. This identified need for improvement is in the area of engagement between the shoe assemblies and the cam itself. The previous solutions had a sliding engagement between the shoe assemblies and the cam surface. This type of construction induces a certain amount of frictional resistance to movement of the shoe assemblies along the cam surface. The ideal shoe assembly in a clutch environment of the type disclosed in the foregoing applications would have no frictional resistance to the movement of the shoe assemblies upon the cam surface.

SUMMARY OF THE INVENTION

The present invention achieves all of the desirable objects listed above and provides an improved clutch mechanism for a hydrodynamic device in which there is relatively minimum frictional resistance to movement of the shoe assemblies along the cam surface of the clutch. The present invention uniquely solves this problem by providing a roller within the shoe assembly, the roller being mounted to be in engagement with the cam surface and to roll as the shoe assembly moves along the cam surface to minimize frictional resistance to such movement. As will be apparent from a description of the present invention, a simplified shoe assembly is provided having a minimum of parts to provide the roller mechanism within the shoe assembly.

A similar solution to the problem is provided in copending application Ser. No. 732,264 filed Oct. 14, 1976 of common assignee. The copending application relates to a sintered metal shoe structure utilizing a pair of springs for each shoe which are releasably connected thereto.

BRIEF DESCRIPTION OF THE DRAWINGS

FIG. 1 is a cross-sectional view through a clutch mechanism for a hydraulic torque converter;

FIG. 2 is a sectional view taken along the lines 2—2 of FIG. 1;

FIG. 3 is a sectional view taken along the lines 3-3 of FIG. 4; and

FIG. 4 is a bottom view of the shoe assembly of FIG. 1.

BRIEF DESCRIPTION OF THE PREFERRED EMBODIMENT

Referring to FIG. 1, an improved lock-up clutch or engaging mechanism 10 is disclosed. Clutch 10 is shown in a hydrodynamic device 12 which may be a hydraulic torque converter having a drive shell 14 connected to drive a vaned impeller member 16. Torque converter 12 includes a vaned turbine member 18 driven hydrodynamically by impeller 16 and includes a stator member 20. The improved lock-up clutch 10 is operative to lock the turbine to the impeller by means of frictional engagement between clutch 10 and an inner annular surface 22 in shell 14.

Turbine 18 includes an outer radial vaned portion 26 which is connected to a hub 30 by rivets 28. Hub 30 is splined at 24 to be connected to a transmission input shaft as is known in the art. Drive shell 14 includes a radially extending portion 32 connected to a central hub 34 which is driven by the engine of the vehicle. Hub 30 of turbine 18 includes an axially extending bearing portion 38. A bearing 40 is provided mounting hub 30 within hub portion 34. Turbine 18 is thus mounted for concentric rotation within shell 14 to provide for concentric rotation between the turbine and impeller 16.

The unique clutch 10 of the present invention is comprised of an annular curved disc 42 and friction devices or shoe assemblies 44. Disc 42 is concentrically mounted upon turbine hub 30 and is secured thereto by rivets 28. Annular disc 42 is curved to conform with the shape and curvature of turbine 18 and radial portion 32 to provide minimum space requirements for clutch mechanism 10 within torque converter 12. As illustrated in FIG. 2, disc 42 has a series of apertures 50 in which shoe assemblies 44 are mounted. Apertures 50 include a series of T-shaped projections 52 which define tabs 54 extending radially toward the center of apertures 50. Tabs 54 have cooperative engagement with shoe assemblies 44 to retain same on discs 42. Also provided centrally of apertures 50 is a cam surface 56, also referred to as a wedge or ramp surface. The cam surfaces 56 have a relatively slight curvature for purposes to be described later.

Shoe assemblies 44 are particularly illustrated in FIGS. 3 and 4. Shoe assemblies 44 are comprised of a rectangular friction shoe 60 being generally arcuate in cross-section as illustrated in FIGS. 1 and 3 to conform with the arcuate shape of surface 22. Assembled to shoe 60 is a spring 62 and a friction lining 64. Also assembled to the shoe is a roller mechanism 66 and a roller retainer 68. Roller mechanism 66 is comprised of a roller pin or axle 70 upon which a roller 72 is mounted. Roller 72 is centrally mounted in shoe 60 in a rectangular slot 74 upon axle 70. Axle 70 is received in partly cylindrical bearing supports or journals 76 defined within a raised portion 78 on retainers 68 on either side of slot 74.

Roller assembly 66 is mounted securely within retainer 68 such that the roller will roll on pin 70, pin 70 serving as a non-rotatable axle. Optionally, the pin 70 may be rotatable in journals 76 and be press-fitted in roller 72 whereby the roller and axle turn as a unit.

Friction lining 64 is bonded to the external arcuate surface 80 on shoe 60. Friction lining 64 may be of a paper or other known type.

Spring 62 and retainer 68 are secured to shoe 60 in the preferred embodiment by a special riveting process. As illustrated in FIG. 3, retainer 68 has four apertures 84 therein, and spring 62 has a similar series of four apertures 86 therein. Assembly 44 is secured together by locating the retainer and the spring together on shoe 60 with the roller assembly and its axles 70 mounted in journals 76, and four rivets or opposite portions 88 are formed or forced out of the material of shoe 60. Rivets 88 extend through apertures 84 and 86 on retainer 68 and spring 62 respectively, the rivets upset or deformed over the retainer 68, thus securing the assembly tightly together. The economies of this type of assembly are obvious in that the rivets are formed from the material of the friction shoe itself.

It will readily be apparent that although a unique type of riveting process and assembly is described, the assembly may be secured together by known techniques such as spot welding, or the normal type of rivets, or by screws.

Spring 62 includes a central body portion 90 having S-shaped sections 92 and 94 adjoining the body 90 at either end thereof. A corner portion 96 of S-shaped section 92 and a corner portion 98 of section 94 engage the undersurface of tabs 54 and retain shoe assemblies 44 within apertures 50 and resist outward movement of shoe assemblies 44 induced by centrifugal force.

Friction shoes 60 have longitudinal centrally located slots 100 on either end thereof. Slots 100 are slightly larger than the thickness of disc 42 and receive the T-shaped portions 52 of the disc therewithin when shoe assembly 44 is mounted in place in apertures 50. Thus, the shoe assembly 44 is guided by the T-shaped sections 52 of the disc 42 as it moves arcuately and along the cam surface 56 when in operation. Thus, slots 100 and their cooperation with T-shaped sections 52 prevent the shoe assembly 44 from cocking or moving at an angle with respect to the axis of rotation as it moves arcuately.

As described above, the unique roller mechanism 66 rolls on cam surface 56 as assembly 44 move arcuately and, thus, provides a relatively frictionless engagement between cam 56 and shoe assembly 44.

The operation of the engaging mechanism 10 of the present invention is that initially the shoe assemblies will be in their retracted position, i.e., the shoe 60 not in engagement with surface 22. As impeller 16 is rotated, as would be the case when the vehicle is to be moved forward from a stopped position, turbine 18 will begin to rotate, and as the speed increases, shoe assemblies 44 will move outwardly in response to centrifugal force against the force of springs 62. When shoes 60 and, in particular, friction material 64 engage surface 22, assembly 44 will move arcuately with respect to disc 42 along cam 56 in a clockwise direction, as illustrated in FIG. 2. The roller assembly 66 rolls along surface 56, and due to the wedging action of cam surface 56, shoes 60 will be wedged into engagement with surface 22 to lock turbine 18 to shell 14 such that impeller 16 and turbine 18 rotate together as a unit.

The engaging mechanism 10 of the present invention, when installed in a hydraulic torque converter as used in an automotive automatic transmission, will release under several conditions which are desired in an environment of this type. The release and reengagement of the clutch 10 occurs due to the inherent structure of the device without the requirement of any outside controls.

It is to be understood that the use of the term "disengaged" herein is meant to indicate a condition in which shoes 60 move radially inwardly out of contact with surface 22. When the term "released," as applied to clutch 10, is used herein, it is intended to include a condition in which shoes 60 may still be in contact with surface 22, but the engaging forces are such that slipping of surface 22 with respect to shoes 60 may take place or, in other words, turbine 18 and impeller 16 may rotate at different speeds.

Due to the design of clutch 10, when the clutch is locked up during operation of the vehicle and the throttle of the vehicle is suddenly depressed to demand higher torque, the drive-line torque will rise to a greater value than the torque capacity of clutch 10 causing clutch 10 to release and allowing the hydraulic torque converter to return to slipping condition, which is desired at such times. This condition may also occur on upshifts in the transmission when a sudden surge or increase in torque will occur momentarily.

When a torque reversal occurs in the drive-line, due to the inherent characteristics of clutch 10, the wedging effect is removed, and the torque capacity of clutch 10 drops to a lower value. Thus, the clutch momentarily releases on down shifts, since a torque reversal may occur at such times. As known in the art, during shifting, release of clutch 10 is desired to allow the converter to return to its shock absorbing characteristics.

It has also been found during test work that upon shifting or ratio changing in an automatic transmission with the present device installed, the torque pulse or reversal which occurs during a shift allows the lock-up clutch 10 to release under these conditions. This inherent feature of the present design is extremely important in that automatic shifts are much smoother when a hydraulic torque converter is operating in its released or normal manner; and if a torque converter is locked up, as, for example, by a conventional lock-up clutch at the time of the shift, the shift could be much harsher than desirable.

The operational characteristics of the torque converter clutch as set out above are more fully explained in above-mentioned copending application, Ser. No. 620,461 filed Oct. 7, 1975, and reference may be had thereto for a fuller understanding of such characteristics.

It is to be noted that upon engagement of shoes 60 with surface 22, the shoe assemblies can rock on the cam surface 56 about roller assembly 66 to self-align with respect to the clutch surface 22.

As mentioned above, cam surfaces 56 are curved, and since the surface on roller 72 is cylindrical, there is line contact between roller 72 and cam surface 56. The purpose of having cam surface 56 curved is to maintain a uniform wedge angle regardless of the position of the friction shoe along the cam surface. As will be recognized by those of ordinary skill in the art, the wedge angle is the angle between a radius drawn from the center of curvature of surface 56 through the point of contact between surface 56 and roller surface 72 and a radius drawn from the center of rotation of internal clutch surface 22 and the point of contact between the roller surface and surface 56. It will also be recognized by those skilled in the art that if cam surface 56 is a flat surface, the wedge angle will vary significantly as the friction shoe moves along surface 56. It will be readily apparent that for the device to function best, it is important to have a constant wedge angle to maintain constant torque capacity even with dimensional variation of the parts.

The wedge angle used, which can be established by varying the curve of surface 56, may be selected from a wide range of angles, the major requirement being the wedge angle must be greater than the angle of friction for the device to engage and disengage properly. As is known, the friction angle is a specific angle for particular types of materials in engagement, being the angle of inclination to an inclined plane on which a body will just overcome its tendency to slide, the inclined plane and the body being of the materials for which the friction angle is to be established.

As noted in the earlier description, one of the conditions which can occur in a structure disclosed in copending application, Ser. No. 700,998 is that if the cam surfaces do not have the proper low coefficient of friction characteristics, the shoe can bind or stick rather than move freely along cam surface 56, which can produce a poorly operating clutch unit. The unique shoe assembly 44 of the present invention solves the frictional characteristic problem in that the shoe assembly rolls along the surface 56 rather than sliding to create a minimum of frictional resistance to movement of assembly 44 along cam surface 56. The shoe assembly as described above is very simple and economical in structure having a sheet metal retainer riveted to the shoe capturing the axle of the roller mechanism in the assembly.

It is to be noted that although the shoe assembly 44 with roller mechanism 66 is shown as used with a clutch 10 having a disc 42 with cams 56 therein, the shoe assemblies 44 could also be used with a clutch having a formed sheet metal type of support having ramps formed therein such as disclosed in copending application Ser. No. 620,461 filed Oct. 7, 1975. Further, it is contemplated that more than one roller assembly 66 could be used in each assembly 44, although the single roller assembly described above is preferred. It is further contemplated that although a roller 72 of cylindrical form is shown and described, the present invention contemplates any type of friction relieving rolling device which may for example include a ball bearing assembly around axle 70, a ball type of spherical mounted on axle 70, or a single diameter cylindrical roller extending nearly the whole width of shoe 60.

Various of the features of the invention have been particularly shown and described, however, it should be obvious to one skilled in the art that modifications may be made therein without departing from the scope of the invention.

What is claimed is:

1. An engaging mechanism comprising, first and second relatively rotating members, an annular disc fixed to said first member, a plurality of shoe assemblies mounted in said disc, cam means on said disc, said assemblies including roller means in engagement with said cam means, said assemblies having a frictional surface thereon, centrifugal force acting to urge said assemblies into engagement with said second member at a given speed of rotation, each assembly including a single spring retaining said assembly on said disc, and said assemblies rolling along said cam means after initial engagement whereby said devices are wedged between said disc and said second member.

2. A mechanism as claimed in claim 1 wherein said spring means are secured to said devices and in engagement with said disc.

3. A mechanism as claimed in claim 1 wherein said cam means comprises a series of ramps distributed around the periphery of said disc.

4. A mechanism as claimed in claim 1 wherein said cam means comprises a curved surface whereby a uniform wedge angle of engagement between said surface and said assemblies is provided regardless of the position of said assemblies along said surface.

5. A mechanism as claimed in claim 1 wherein each said shoe assembly includes a friction shoe, a retainer secured to said shoe, said retainer having journal means therein, a roller assembly including a roller and axle, said axle being mounted in said journal means whereby said roller assembly is secured in said shoe assembly.

6. A mechanism as claimed in claim 5 wherein said roller is mounted centrally of said shoe.

7. A mechanism as claimed in claim 5 wherein said retainer is secured to said shoe by rivets.

8. A mechanism as claimed in claim 7 wherein said rivets are formed from the material of the shoe.

9. A mechanism as claimed in claim 5 wherein said spring means is mounted between said retainer and said shoe.

10. A mechanism as claimed in claim 5 wherein said shoes include a guide slot at either end thereof receiving said disc whereby said shoe is guided in its movement with respect to said disc.

11. A clutch mechanism for use in a hydraulic torque converter having impeller and turbine elements, an annular disc fixed to one of said elements, a plurality of shoe assemblies mounted in said disc, cam means on said disc, said shoe assemblies including roller means in engagement with said cam means, said assemblies having a frictional surface thereon, centrifugal force acting to urge said assemblies into engagement with said other element at a given speed of rotation each said shoe assembly including a single spring retaining said assembly on said disc, and said friction devices rolling along said cam means after initial engagement whereby said devices are wedged between said disc and said other element.

12. A mechanism as claimed in claim 11 wherein said one element is said turbine element and said other element is said impeller element.

13. A shoe assembly for a clutch mechanism including a friction shoe, a retainer secured to said shoe, a spring between said retainer and said shoe, said retainer having journal means therein, a roller assembly including a roller and axle, said axle being mounted in said journal means whereby said roller assembly is secured in said shoe assembly.

14. A mechanism as claimed in claim 13 wherein said roller is mounted centrally of said shoe.

15. A mechanism as claimed in claim 13 wherein said retainer is secured to said shoe by rivets formed from the material of the shoe.

* * * * *